US012620394B2

(12) United States Patent
Shin

(10) Patent No.: US 12,620,394 B2
(45) Date of Patent: May 5, 2026

(54) QUERY RESPONSE INTERFACE WITH SERVER SIDE GENERATIVE MODEL(S)

(71) Applicant: GOOGLE LLC, Mountain View, CA (US)

(72) Inventor: Dongeek Shin, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 104 days.

(21) Appl. No.: 18/642,367

(22) Filed: Apr. 22, 2024

(65) Prior Publication Data

US 2025/0329328 A1     Oct. 23, 2025

(51) Int. Cl.
| | |
|---|---|
| *G10L 15/183* | (2013.01) |
| *G06F 3/16* | (2006.01) |
| *G06F 16/635* | (2019.01) |
| *G06F 16/638* | (2019.01) |
| *G10L 13/02* | (2013.01) |
| *G10L 15/22* | (2006.01) |
| *G10L 15/30* | (2013.01) |

(52) U.S. Cl.
CPC ............ *G10L 15/183* (2013.01); *G06F 3/167* (2013.01); *G06F 16/635* (2019.01); *G06F 16/638* (2019.01); *G10L 13/02* (2013.01); *G10L 15/22* (2013.01); *G10L 15/30* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 12,394,411 | B2 * | 8/2025 | Singh | .................. G10L 15/1822 |
| 2010/0076994 | A1 * | 3/2010 | Soroca | .................... G06F 16/68 |
| | | | | 707/769 |
| 2011/0320493 | A1 * | 12/2011 | Lemoine | .............. G06F 40/211 |
| | | | | 707/E17.014 |
| 2012/0150864 | A1 * | 6/2012 | Palakodety | ............. G06F 16/31 |
| | | | | 707/741 |

(Continued)

OTHER PUBLICATIONS

European Patent Office; International Search Report and Written Opinion issued in Application No. PCT/US2025/022987; 14 pages; dated Jun. 23, 2025.

(Continued)

*Primary Examiner* — Marcus T Riley
(74) *Attorney, Agent, or Firm* — Gray Ice Higdon

(57) ABSTRACT

Various implementations include processing, at a client device, an instance of audio data capturing a user voice query using an automatic speech recognition model to generate a sequence of instances of tokenizable query text. In many implementations, one or more instances of the sequence can be transmitted to a remote computing system prior to generating the entire sequence. In a variety of implementations, each instance in the sequence can be processed using a generative model which includes a streaming multi-head attention portion. Responsive output can be transmitted from the remote computing system to the client device, where the client device renders the responsive output to the user. In many implementations, the time between the user speaking the user query and the client device rendering the responsive output is reduced, thus decreasing latency in the system.

18 Claims, 6 Drawing Sheets

(56)     References Cited

U.S. PATENT DOCUMENTS

2013/0055097 A1* 2/2013 Soroca ............... G06Q 30/0246
                                                    715/738
2023/0142836 A1* 5/2023 Tang ....................... G10L 15/16
                                                    704/232
2024/0029743 A1* 1/2024 Pasko .................... G10L 17/26
2025/0329328 A1* 10/2025 Shin ........................ G10L 13/02

OTHER PUBLICATIONS

Anonymous Authors, "Elementwise Language Representation" TMLR, 14 pages.
Xiong et al., "Natural Language based Context Modeling and Reasoning with LLMs: A Tutorial" arXiv:2309.15074v1 [cs.CL], 30 pages, dated Sep. 24, 2023.

* cited by examiner

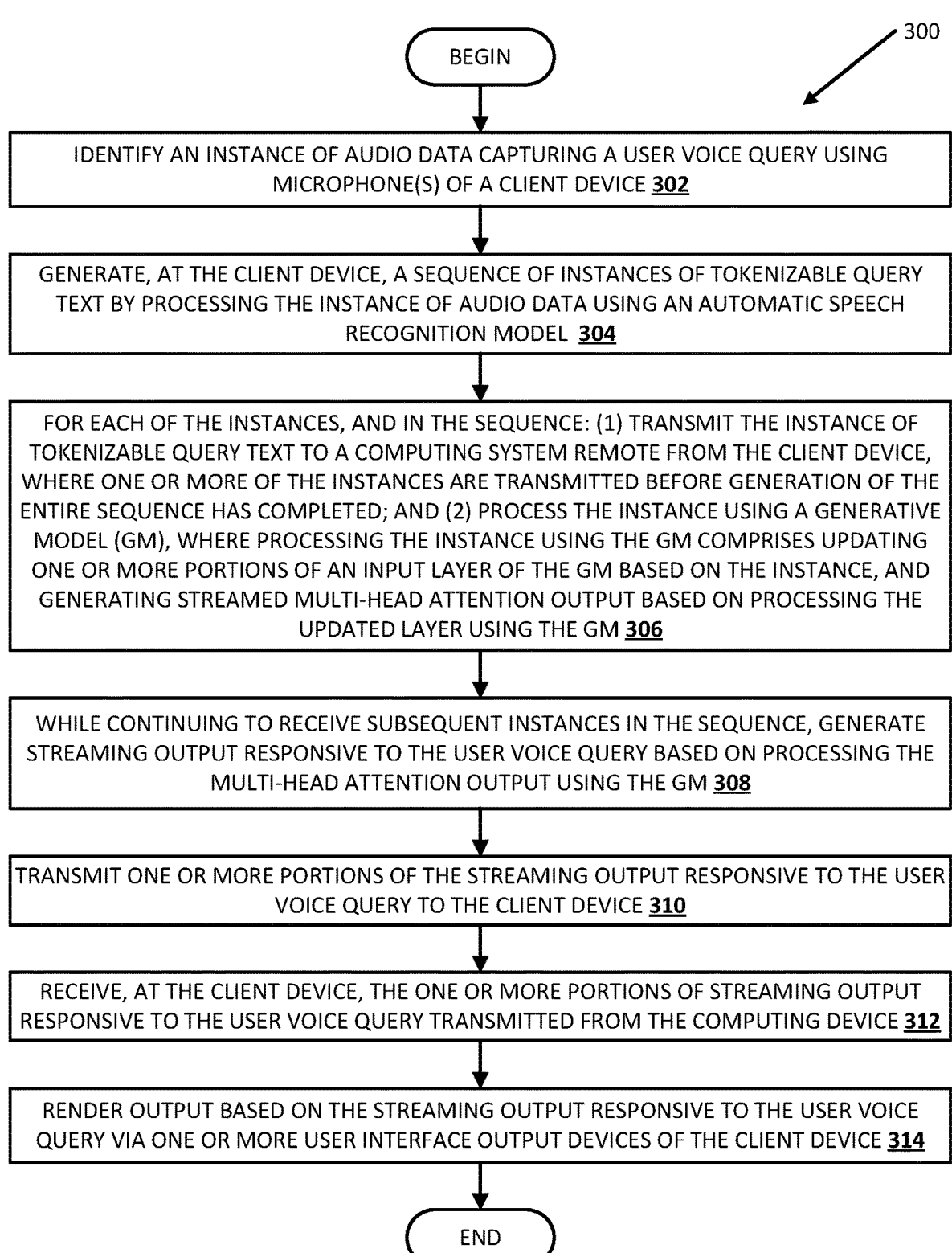

300

BEGIN

IDENTIFY AN INSTANCE OF AUDIO DATA CAPTURING A USER VOICE QUERY USING MICROPHONE(S) OF A CLIENT DEVICE 302

GENERATE, AT THE CLIENT DEVICE, A SEQUENCE OF INSTANCES OF TOKENIZABLE QUERY TEXT BY PROCESSING THE INSTANCE OF AUDIO DATA USING AN AUTOMATIC SPEECH RECOGNITION MODEL 304

FOR EACH OF THE INSTANCES, AND IN THE SEQUENCE: (1) TRANSMIT THE INSTANCE OF TOKENIZABLE QUERY TEXT TO A COMPUTING SYSTEM REMOTE FROM THE CLIENT DEVICE, WHERE ONE OR MORE OF THE INSTANCES ARE TRANSMITTED BEFORE GENERATION OF THE ENTIRE SEQUENCE HAS COMPLETED; AND (2) PROCESS THE INSTANCE USING A GENERATIVE MODEL (GM), WHERE PROCESSING THE INSTANCE USING THE GM COMPRISES UPDATING ONE OR MORE PORTIONS OF AN INPUT LAYER OF THE GM BASED ON THE INSTANCE, AND GENERATING STREAMED MULTI-HEAD ATTENTION OUTPUT BASED ON PROCESSING THE UPDATED LAYER USING THE GM 306

WHILE CONTINUING TO RECEIVE SUBSEQUENT INSTANCES IN THE SEQUENCE, GENERATE STREAMING OUTPUT RESPONSIVE TO THE USER VOICE QUERY BASED ON PROCESSING THE MULTI-HEAD ATTENTION OUTPUT USING THE GM 308

TRANSMIT ONE OR MORE PORTIONS OF THE STREAMING OUTPUT RESPONSIVE TO THE USER VOICE QUERY TO THE CLIENT DEVICE 310

RECEIVE, AT THE CLIENT DEVICE, THE ONE OR MORE PORTIONS OF STREAMING OUTPUT RESPONSIVE TO THE USER VOICE QUERY TRANSMITTED FROM THE COMPUTING DEVICE 312

RENDER OUTPUT BASED ON THE STREAMING OUTPUT RESPONSIVE TO THE USER VOICE QUERY VIA ONE OR MORE USER INTERFACE OUTPUT DEVICES OF THE CLIENT DEVICE 314

END

FIG. 3

BEGIN

RECEIVE, AT A COMPUTING SYSTEM REMOTE FROM A CLIENT DEVICE, A SEQUENCE OF INSTANCES OF TOKENIZABLE QUERY TEXT, WHERE THE SEQUENCE OF INSTANCES OF TOKENIZABLE QUERY TEXT ARE A TEXT REPRESENTATION OF A USER VOICE QUERY GENERATED AT THE CLIENT DEVICE BY PROCESSING AUDIO DATA CAPTURING THE USER VOICE QUERY USING AN AUTOMATIC SPEECH RECOGNITION MODEL, AND WHERE ONE OR MORE OF THE INSTANCES OF THE SEQUENCE ARE TRANSMITTED BEFORE GENERATION OF THE ENTIRE SEQUENCE AT THE CLIENT DEVICE HAS COMPLETED 502

FOR EACH INSTANCE AND IN THE SEQUENCE: PROCESSING THE INSTANCE USING A GENERATIVE MODEL, WHERE PROCESSING THE INSTANCE USING THE GM COMPRISES UPDATING ONE OR MORE PORTIONS OF AN INPUT LAYER OF THE GM BASED ON THE INSTANCE, AND GENERATING STREAMED MULTI-HEAD ATTENTION OUTPUT BASED ON PROCESSING THE UPDATED LAYER 504

SUBSEQUENT TO RECEIVING THE ENTIRE SEQUENCE, GENERATE STREAMING OUTPUT RESPONSIVE TO THE USER VOICE QUERY BASED ON PROCESSING THE MULTI-HEAD ATTENTION OUTPUT USING THE GM 506

TRANSMIT ONE OR MORE PORTIONS OF THE STREAMING OUTPUT RESPONSIVE TO THE USER VOICE QUERY TO THE CLIENT DEVICE 508

END

FIG. 5

QUERY RESPONSE INTERFACE WITH SERVER SIDE GENERATIVE MODEL(S)

BACKGROUND

Humans may engage in human-to-computer dialogs with interactive software applications referred to herein as "automated assistants" (also referred to as "chatbots", "interactive personal assistants", "intelligent personal assistants", "personal voice assistants", "conversational agents", etc.). Automated assistants typically reply upon a pipeline of components for interpreting and responding to natural language (NL) based inputs received during a dialog session. Generative models (GMs), such as large language models (LLMs), are particular types of machine learning models that are trained on enormous amounts of diverse data and that can perform various natural language processing (NLP) tasks. Recent developments have integrated aspects of LLMs into this pipeline of components for interpreting and responding to the NL based inputs. Generally, a dialog session with an automated assistant that is integrated with aspects of LLMs is initiated by a user providing a NL based input, and the automated assistant can't generate a response to the NL based inputs using the aforementioned pipeline of components.

SUMMARY

Techniques described herein are directed towards reducing latency during a dialog session between a user and a client device, where at least part of the output responsive to a user voice query is generated using a generative model at a computing system remote from the client device. For example, a user can speak a user voice query, where audio data (e.g., audio data capturing the user voice query) can be captured via one or more microphones of a client device (e.g., a mobile phone). In some implementations, the audio data can be processed using an automatic speech recognition (ASR) model to generate a text representation of the user voice query. In some of those implementations, the ASR model can be stored locally at the client device, and processing of the audio data using the ASR model to generate the text representation of the user voice query can occur at the client device.

In some implementations, the text representation of the spoken utterance can be generated as a sequence of instances of tokenizable query text. As used herein, tokenizable text is text that can be broken into smaller portions (e.g., tokens) such as sentences, words, word pieces, characters, etc. Additionally or alternatively, tokenizable text as used herein can be text represented by a sequence of instances of tokens such as a sequence of sentences, a sequence of words, a sequence of word pieces, a sequence of characters, etc.

In some implementations, the instances in the sequence can be transmitted to the remote computing system after they are generated, and prior to generating the entire sequence. For example, sequence of instances of tokenizable query text can be a sequence of characters, a sequence of words, a sequence of word pieces, a sequence of one or more additional or alternative. One or more of the instances can be transmitted to the remote computing system as soon as they are generated and/or soon after they are generated, where the one or more instances of tokenizable query text in the sequence are transmitted prior to processing the entire instance of audio data using the ASR model.

In existing techniques, the system waits until the entire text representation of the user query is generated before transmitting the text representation to the remote computing system (e.g., input side batching of the text representation of the user query). In some implementations, the generative model is stored at the remote computing system to support the heavy computational resources necessary to process user query text using the generative model. However, waiting to transmit the complete text representation to the remote computing system increases latency in the system. For example, input side transcription batching can cause a bottleneck in the processing of the user query text to generate responsive output.

In contrast, implementations described herein can process one or more instances of the sequence to the remote computing system before generation of the entire sequence at the client device. By transmitting one or more portions of the query text to the remote computing system while the client device is still processing the audio data, the computing system can begin to process the query text while the client device is concurrently processing the audio data to generate the full transcription of the user query. In some implementations, the generative model can include a streamed multi-head attention layer to process the tokenized instances of query text while the full transcription of the user query is generated at the client device. Once the remote computing system has received the entire sequence of instances of tokenizable query text, output from the streamed multi-head attention layer can be processed using one or more additional layers of the generative model to generate output responsive to the user query. The output responsive to the user query can be transmitted to the client device, where responsive output can be rendered for the user via one or more user interface output devices of the client device.

Accordingly, implementations described herein are directed towards using a streaming multi-head attention layer in a generative model to reduce the overall computation time for a user voice query. The remote computing system can begin processing instance(s) of the tokenizable user query text using the multi-head attention layer of the generative model while the client device is concurrently generating one or more additional portions of the user query text. In some implementations, the time between the end of receiving the user query and the beginning to output content responsive to the user query is reduced by processing the sequence of instances of tokenizable query text using the multi-head attention layer of the generative model. In other words, latency between the time the user finishes speaking the user query and the time the system begins to respond to the query is reduced.

The above description is provided as an overview of only some implementations disclosed herein. Those implementations, and other implementations, are described in additional detail herein. Further, it should be understood that techniques disclosed herein can be implemented locally on a client device, remotely by server(s) connected to the client device via one or more networks, and/or both.

BRIEF DESCRIPTION OF THE DRAWINGS

FIG. 3 depicts a flowchart illustrating an example process of generating output responsive to a user query in accordance with various implementations.

FIG. 5 depicts a flowchart illustrating an example process of generating output responsive to a user query at a computing system remote from the client device in accordance with various implementations.

DETAILED DESCRIPTION

Figures 1A, 1B:
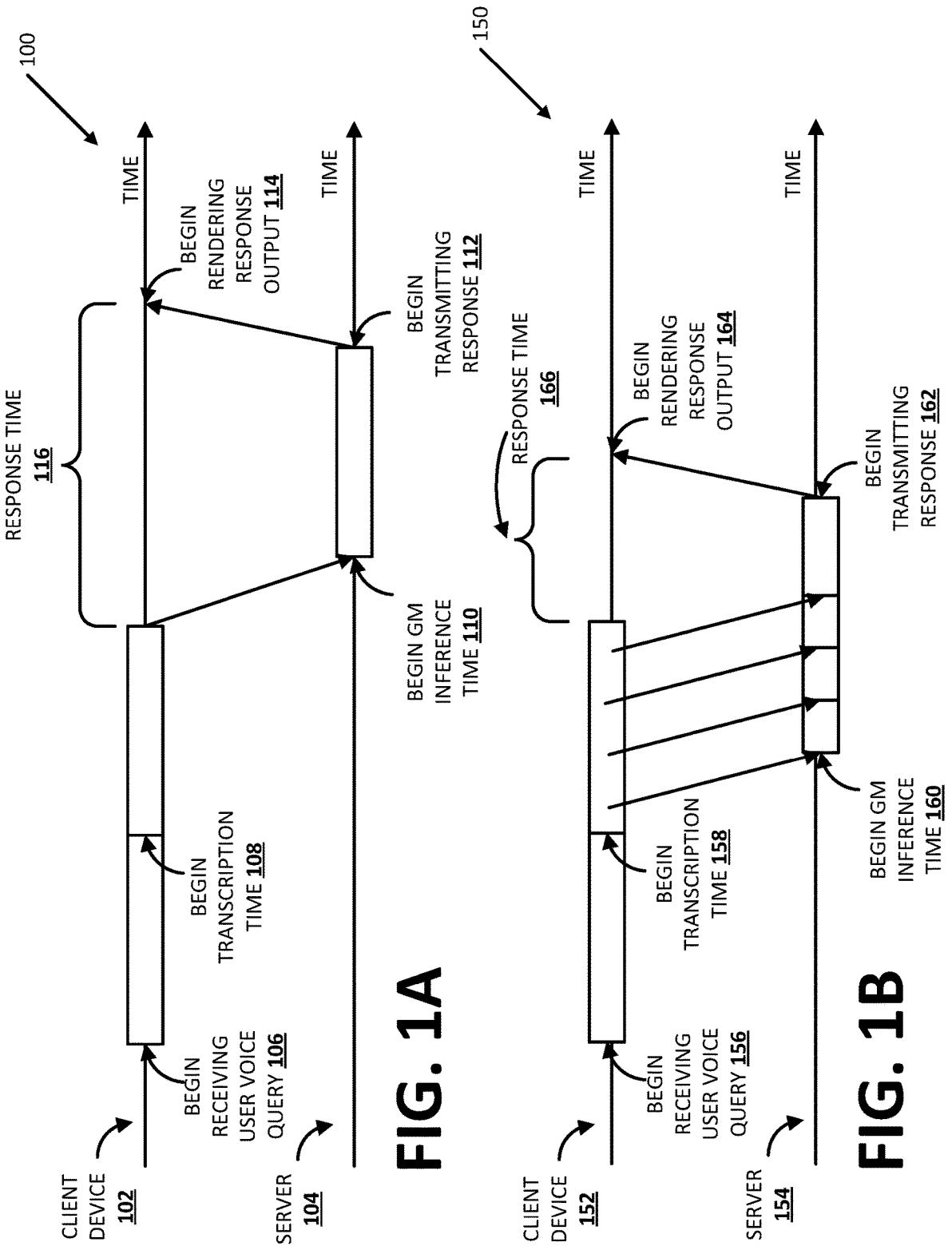
FIG. 1A depicts a timing diagram of an example of generating output responsive to a user query using batched transcription of the user query.
FIG. 1B depicts a timing diagram of an example of generating output responsive to a user query using a sequence of instances of tokenized query text and streamed multi-head attention in accordance with various implementations.

Turning now to the figures, FIG. 1A is a timing diagram illustrating an example 100 of generating output responsive to a user query without the use of tokenized query text and streamed multi-head attention. Example 100 includes a client device 102 and a server 104. At time 106, the client device begins receiving a user voice query. In some implementations, the user voice query is captured as audio data via one or more microphones of the client device. In some other implementations, the client device receives the user voice query from one or more additional or alternative computing devices (not depicted). At time 108, the client device finishes receiving the user voice query audio data and begins transcription 108 of the user voice query text. In some implementations, the audio data capturing the user voice query can be processed using an ASR model local to the client device to generate the text representation of the user query.

Example 100 illustrates batched transcription, where the text representation of the user query is transmitted to the server 104 after the entire text representation is generated. At time 110, the server 104 begins processing the text representation of the user query using a generative model. At time 112, the server completes processing the text representation of the user query using the generative model and begins to transmit the response to the client device. At time 114, the client device receives the response and begins to render output responsive to the user query. The response time 116 begins when the client device transmits the text of the user query to the server and ends when the client device begins to render output responsive to the user query.

FIG. 1B is a timing diagram illustrating an example 150 of generating output responsive to a user query which includes a sequence of instances of tokenized query text and streamed multi-head attention. Example 150 includes a client device 152 and a server 154. At time 156, the client device begins receiving a user voice query. In some implementations, the user voice query is captured as audio data via one or more microphones of the client device. In some other implementations, the client device receives the user voice query from one or more additional or alternative computing devices (not depicted). At time 158, the client device finishes receiving the user voice query and begins transcription 158 of the user voice query.

In some implementations, the same user query can be received by client device 102 in example 100 and client device 152 in example 150. In some of those implementations, the length of time to receive the same user voice query (e.g., the length of time between 106 and 108 in example 100, and the length of time between 156 and 158 in example

150) is the same in examples 100 and 150. While the client device in example 100 waits until the text representation of the user query is generated before transmitting the text to the server, the client device in example 150 begins transmitting portions of the text representation to the server as soon as they are available. In some implementations, the system can begin processing the portions of the text representation using the generative model at time 160 prior to the server receiving each of the instances of the text representation of the user query.

For example, the system can process a given instance in the sequence of instances of the tokenizable user query text using an element-wise tokenizer, where the given instance is the latest instance received by the server. Additionally or alternatively, the input layer of the generative model can be shifted based on the given instance. In some implementations, streamable multi-head attention output can be generated based on updating the input layer of the generative model. In some implementations, once the server has received all of the instances of tokenizable query text in the sequence, the system can process the streamed multi-head attention output using the generative model to generate response output. At time 162, the system finishes processing the text representation of the user query using the generative model to generate the responsive output, and begins transmitting the response output to the client device. At time 164, the client device begins to render output responsive to the user query.

The response time 166 begins when the client device finishes transmitting the sequence of instances of tokenizable user query text and ends when the client device begins rendering output responsive to the user query. In example 150, the server can begin processing one or more portions of the user query text while the client device is still generating one or more additional portions of the user query text. By beginning to process portions of the user query text using the generative model sooner, the server can complete the processing of the user query text sooner in example 150 compared to example 100. Similarly, the length of time the system takes to respond with output responsive to the user query in example 150 (e.g., response time 166) is a shorter length of time compared to the length of time the system takes to respond with output responsive to the user query in example 100 (e.g., response time 116). By reducing the response time, latency of the system is reduced.

Figure 2:
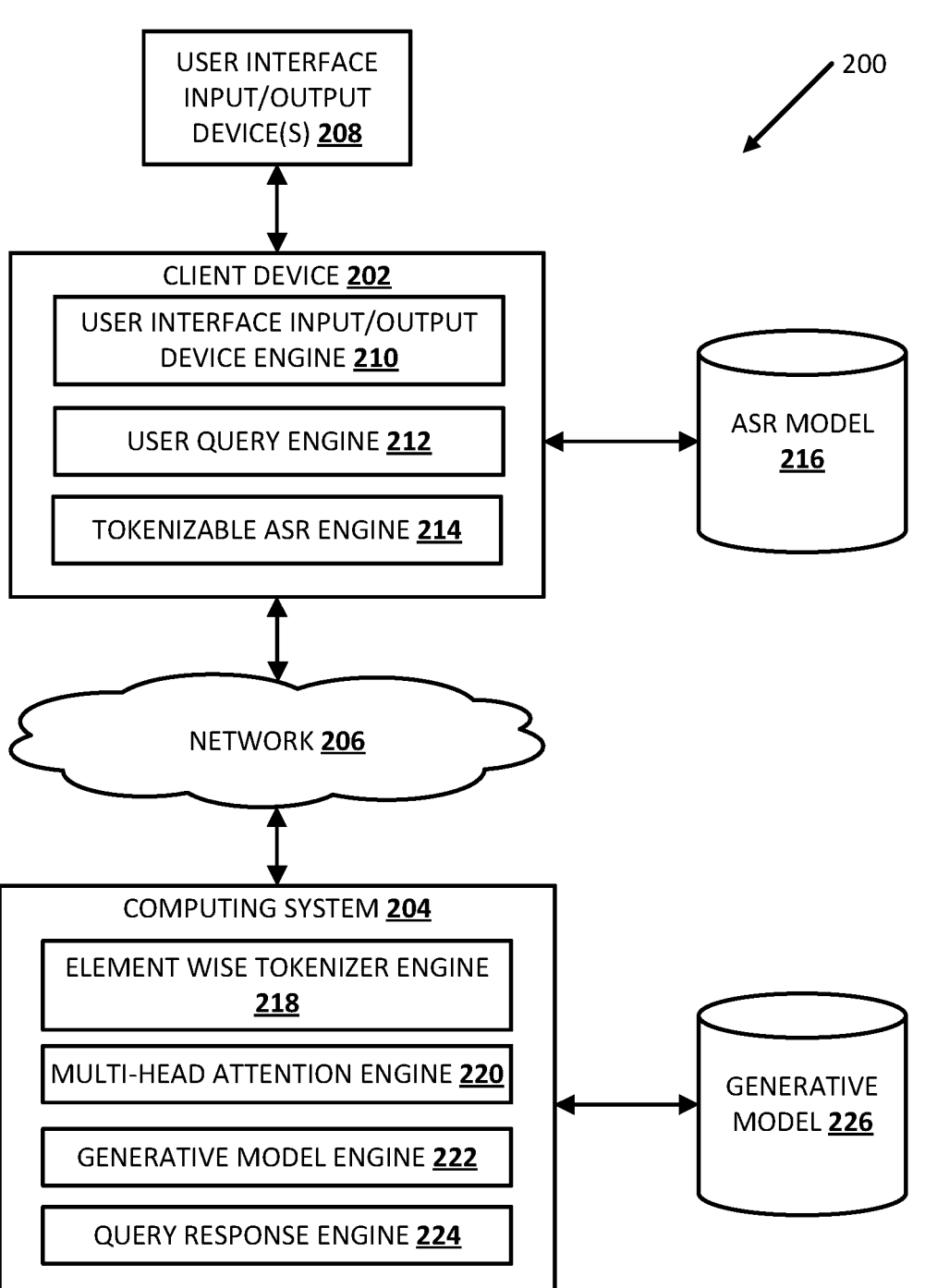
FIG. 2 depicts a block diagram of an example environment in which implementations disclosed herein can be implemented.

FIG. 2 is a block diagram of an example environment 200 that demonstrates various aspects of the present disclosure, and in which implementations disclosed herein can be implemented is depicted. The example environment 200 includes a client device 202, user interface input/output device(s) 208, computing system 204, one or more additional or alternative components (not depicted), and/or combinations thereof. The client device 202 includes user interface input/output device engine 210, user query engine 212, tokenizable ASR engine 214, one or more additional or alternative engines (not depicted), and/or combinations thereof. Additionally or alternatively, the client device 202 may be associated with ASR model 216, one or more additional or alternative components (not depicted), and/or combinations thereof.

The computing system 204 includes element-wise tokenizer engine 218, multi-head attention engine 220, generative model engine 222, query response engine 224, one or more additional or alternative engines (not depicted), and/or combinations thereof. Additionally or alternatively, the computing system 204 may be associated with generative model 226, one or more additional or alternative components (not depicted), and/or combinations thereof.

In some implementations, client device 202, computing system 204, and/or additional or alternative components may be communicatively coupled with each other via one or more networks, such as one or more wired or wireless local area networks ("LANs," including Wi-Fi LANs, mesh networks, Bluetooth, near-field communication, etc.) or wide area networks ("WANs", including the Internet).

In some implementations, the client device 202 may include one or more user interface input/output devices 208, which may include, for example, a physical keyboard, a touch screen (e.g., implementing a virtual keyboard or other textual input mechanisms), a microphone, a camera, a display screen, and/or speaker(s). The user interface input/output device(s) 208 may be incorporated with one or more client devices 202 of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of client device 202 may be implemented on a computing system that also contains the user interface input/output devices.

Some non-limiting examples of client device 202 and/or computing system 204 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Client device 202 and/or computing system 204 may include one or more memories for storage of data and software applications, one or more processors for accessing data and executing applications, and other components that facilitate communication over a network. The operations performed by client device 202 and/or computing system 204 may be distributed across multiple computing devices. For example, computing programs running on one or more computers in one or more locations can be coupled to each other through a network.

In some implementations user interface input/output device engine 210 can cause the client device to capture audio data (e.g., audio data capturing the user speaking a user query) via one or more microphones 208 of the client device. Additionally or alternatively, the user interface input/output device engine 210 can render responsive output via one or more user interface output devices 208 to the user. In some implementations, the user interface input/output device engine 210 can process a text representation of the responsive output using a speech generation model (not depicted) to generate synthetic speech of a computer generated voice speaking the responsive output. In some of those implementations, the user interface input/output device engine 210 can render the synthetic speech capturing the responsive output via one or more microphones 208 of the client device. Additionally or alternatively, the user interface input/output device engine 210 can render a text representation of the responsive output via one or more display devices 208 of the client device.

Tokenizable ASR engine 214 can be used to process the audio data capturing the user query (e.g., the audio data captured using user interface input/output device engine 210 via one or more microphones 208) using the ASR model 216 to generate a sequence of instances of tokenizable user query text. The sequence of instances of tokenizable user query text is a text representation of the user query. In some implementations, the sequence of instances of tokenizable user query text is a sequence of instances of sentences, words, word pieces, characters, one or more additional or alternative tokens, and/or combinations thereof. In some implementations, ASR model 216 can be stored locally at the client device and/or processing of audio data using the ASR model 216 can occur locally at the client device.

User query engine 212 can be used to transmit one or more instances of the sequence of instances of tokenizable query text to the computing system 204. For example, the user query engine 212 can begin transmitting instances in the sequence while the tokenizable ASR engine 214 is being used to process one or more additional portions of the audio data using the ASR model 216.

Element-wise tokenizer engine 218 can process each received instance in the sequence of tokenizable query text. In some of those implementations, the element-wise tokenizer engine 218 shifts an input layer of the generative model based on the most recently received instance of the sequence.

Multi-head attention engine 220 can process output from the element-wise tokenizer engine 218 using a streamed multi-head attention layer (not depicted) of the generative model 226 to generate multi-head attention output. In some implementations, generative model engine 222 processes the multi-head attention output using the generative model 226 to generate output responsive to the user query. In some implementations the generative model (226) can be a large language model (LLM). In some implementations, the generative model can include an encoder portion and a decoder portion, where the encoder portion processes received input to generate an encoded representation of the input, and where the decoder portion processes the encoded representation of the input to generate the responsive output. For example, the generative model can be a transformer model, a sequence to sequence model, one or more additional or alternative models, and/or combinations thereof. Additionally or alternatively, the generative model at inference time can include only the decoder portion (e.g., the decoder portion was trained with the encoder portion, but at inference time the system only uses the decoder portion for processing).

Query response engine 224 can transmit the output responsive to the user query generated using the generative model 226 to client device 202. In some implementations, query response engine 224 can transmit the responsive output once the system has generated the entire instance of responsive output. Additionally or alternatively, the query response engine 224 can transmit the responsive output in a streaming manner, transmitting one or more portions of the output as it is generated.

Although FIG. 2 is described with respect to a single client device having a single user, it should be understood that is for the sake of example and is not meant to be limiting. For example, one or more additional client devices of a user can also implement the techniques described herein. For instance, the client device 202, the one or more additional client devices, and/or any other computing devices of the user can form an ecosystem of devices that can employ techniques described herein. These additional client devices and/or computing devices may be in communication with the client device 202 (e.g., over one or more network(s)). As another example, a given client device can be utilized by multiple users in a shared setting (e.g., in a household environment, in an enterprise or work environment, in a hospitality environment, etc.).

FIG. 3 is a flowchart illustrating an example process 300 of generating output responsive to a user query in accordance with various implementations disclosed herein. For convenience, the operations of the flowchart are described with reference to a system that performs the operations. This system may include various components of various computer systems, such as one or more components of client device 202, computing system 204, and/or computing system 610. Moreover, while operations of process 300 are shown in a particular order, this is not meant to be limiting. One or more operations may be reordered, omitted, and/or added.

At block 302, the system identifies, at a client device, an instance of audio data capturing a user voice query. In some implementations, the audio data is captured via one or more microphones of the client device. For example, one or more microphones of Katherine's mobile phone can capture audio data of her saying "What is the weather in Seattle next Tuesday?".

At block 304, the system generates, at the client device, a sequence of instances of tokenizable query text by processing the instance of audio data using an automatic speech recognition (ASR) model. For example, the ASR model can generate a sequence of instances of query text of 'what' 'is' 'the' 'weather' 'in' 'Seattle' 'next' 'Tuesday', where each instance in the sequence represents a word. Additionally or alternatively, the ASR model can process the audio data to generate a sequence of sentences, a sequence of word pieces, a sequence of characters, one or more additional or alternative sequences of instances, and/or combinations thereof.

At block 306, for each of the instances, and in the sequence, the system transmits the instance of tokenizable query text to a computing system remote from the client device, where one or more of the instances are transmitted before generation of the entire sequence has completed. For example, Katherine's mobile phone can transmit 'what' to the remote computing system. The remote computing system can process 'what' using GM while the client device is continuing to process the audio data using the ASR to generate the next instance in the sequence of 'is'.

At block 308, while continuing to receive subsequent instances in the sequence, at the computing system, the system generates streaming output responsive to the user voice query based on processing the multi-head attention output using the GM. In some implementations, an element-wise tokenizer processes the instance in the sequence received from the client device. In some of those implementations, the element-wise tokenizer processes only the most recently received instance in the sequence. Additionally or alternatively, the streaming multi-head attention layer of the generative model can be shifted based on the instance in the sequence.

In some implementations, after the last instance in the sequence has been processed using the element-wise tokenizer and multi-head attention layer, multi-head attention output can be generated. The multi-head attention output can be processed using the generative model to generate the output responsive to the tokenizable user query. In some implementations, the generative model can be a large language model (LLM). In some implementations, the generative model can include an encoder portion and a decoder portion, where the encoder portion processes received input to generate an encoded representation of the input, and where the decoder portion processes the encoded representation of the input to generate the responsive output. For example, the generative model can be a transformer model, a sequence to sequence model, one or more additional or alternative models, and/or combinations thereof. Additionally or alternatively, the generative model at inference time can include only the decoder portion (e.g., the decoder portion was trained with the encoder portion, but at inference time the system only uses the decoder portion for processing).

At block 310, the system transmits, from the computing device, one or more portions of the output responsive to the user voice query to the client device. In some implementations, the system can wait until all of the output responsive to the user voice query is generated using the generative model before transmitting the output to the client device. Additionally or alternatively, the remote computing device can transmit one or more portions of the output to the client device in a streaming manner, where portion(s) are transmitted to the client device when they are available.

At block 312, the system receives, at the client device, the one or more portions of streaming output responsive to the user voice query transmitted from the computing device.

At block 314, the system renders output based on the streaming output responsive to the user voice query via one or more user interface output devices of the client device. In some implementations, the client device can process the responsive output using a speech generation model to generate audio output which includes a synthetic speech representation of the output, and can render the synthetic speech using one or more speakers of the client device. In some implementations, the client device can render the responsive output as graphical output via one or more display devices of the client device.

Figure 4:
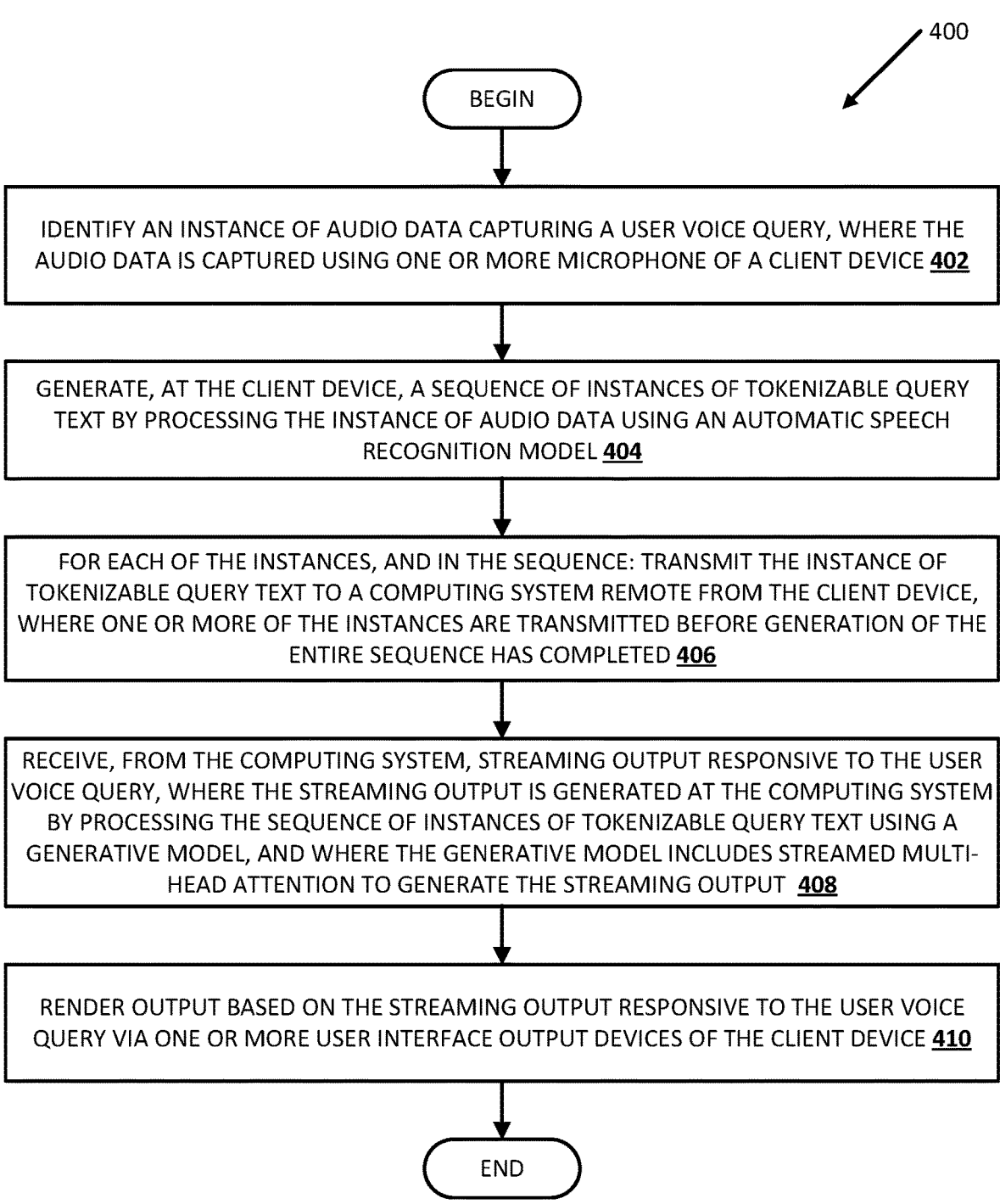
FIG. 4 depicts a flowchart illustrating an example process of rendering output responsive to a user query at a client device in accordance with various implementations.

FIG. 4 is a flowchart illustrating an example process 400 of rendering output responsive to a user query in accordance with various implementations disclosed herein. For convenience, the operations of the flowchart are described with reference to a system that performs the operations. This system may include various components of various computer systems, such as one or more components of client device 202, computing system 204, and/or computing system 610. Moreover, while operations of process 400 are shown in a particular order, this is not meant to be limiting. One or more operations may be reordered, omitted, and/or added.

At block 402, the system identifies an instance of audio data capturing a user voice query, where the audio data is captured via one or more microphones of a client device. In some implementations, the audio data is captured via one or more microphones of the client device. For example, one or more microphones of Katherine's mobile phone can capture audio data of her saying "What is the weather in Seattle next Tuesday?".

At block 404, the system generates, at the client device, a sequence of instances of tokenizable query text by processing the instance of audio data using an automatic speech recognition model. For example, the ASR model can generate a sequence of instances of query text of 'what' 'is' 'the' 'weather' 'in' 'Seattle' 'next' 'Tuesday', where each instance in the sequence represents a word. Additionally or alternatively, the ASR model can process the audio data to generate a sequence of sentences, a sequence of word pieces, a sequence of characters, one or more additional or alternative sequences of instances, and/or combinations thereof.

At block 406, for each of the instances, and in the sequence, the system transmits the instance of tokenizable query text to a computing system remote from the client device, where one or more of the instances are transmitted before generation of the entire sequence has completed. For example, Katherine's mobile phone can transmit 'what' to the remote computing system. The remote computing system can process 'what' using GM while the client device is continuing to process the audio data using the ASR to generate the next instance in the sequence of 'is'.

At block 408, the system receives, from the computing system, streaming output responsive to the user voice query. In some implementations, the stream output is generated at the computing system by processing the sequence of instances of tokenizable query text using a GM. In some of those implementations, the GM includes streamed multi-head attention to generate the streaming output. In some implementations, an element-wise tokenizer processes the instance in the sequence received from the client device. In some of those implementations, the element-wise tokenizer processes only the most recently received instance in the sequence. Additionally or alternatively, the streaming multi-head attention layer of the generative model can be shifted based on the instance in the sequence.

In some implementations, after the last instance in the sequence has been processed using the element-wise tokenizer and multi-head attention layer, multi-head attention output can be generated. The multi-head attention output can be processed using the generative model to generate the output responsive to the tokenizable user query. In some implementations, the generative model can be a large language model (LLM). In some implementations, the generative model can include an encoder portion and a decoder portion, where the encoder portion processes received input to generate an encoded representation of the input, and where the decoder portion processes the encoded representation of the input to generate the responsive output. Additionally or alternatively, the generative model at inference time can include only the decoder portion (e.g., the decoder portion was trained with the encoder portion, but at inference time the system only uses the decoder portion for processing).

At block 410, the system renders output based on the streaming output responsive to the user voice query via one or more user interface output devices of the client device. In some implementations, the client device can process the responsive output using a speech generation model to generate audio output which includes a synthetic speech representation of the output, and can render the synthetic speech using one or more speakers of the client device. In some implementations, the client device can render the responsive output as graphical output via one or more display devices of the client device.

FIG. 5 is a flowchart illustrating an example process 500 of generating output responsive to a user query in accordance with various implementations disclosed herein. For convenience, the operations of the flowchart are described with reference to a system that performs the operations. This system may include various components of various computer systems, such as one or more components of client device 202, computing system 204, and/or computing system 610. Moreover, while operations of process 500 are shown in a particular order, this is not meant to be limiting. One or more operations may be reordered, omitted, and/or added.

At block 502, the system receives, at a computing system remote from a client device, a sequence of instances of tokenizable query text, where the sequence of instances of tokenizable query text are a text representation of a user voice query generated at the client device by processing audio data capturing the user voice query using an automatic speech recognition model, and where one or more of the instances of the sequence are transmitted before generation of the entire sequence at the client device has completed. In some implementations, the audio data is captured via one or more microphones of the client device.

For example, one or more microphones of Katherine's mobile phone can capture audio data of her saying "What is the weather in Seattle next Tuesday?". In some implementations, the ASR model can generate a sequence of instances of query text of 'what' 'is' 'the' 'weather' 'in' 'Seattle' 'next' 'Tuesday', where each instance in the sequence represents a word. Additionally or alternatively, the ASR model can process the audio data to generate a sequence of sentences, a sequence of word pieces, a sequence of characters, one or more additional or alternative sequences of instances, and/or combinations thereof. In some implementations, Katherine's mobile phone can transmit 'what' to the remote computing system. The remote computing system can process 'what' using GM while the client device is continuing to process the audio data using the ASR to generate the next instance in the sequence of 'is'.

At block 504, for each instance and in the sequence, the system processes the instance using a generative model, where processing the instance using the generative model comprises updating one or more portions of an input layer of the generative model based on the instance, and generating streamed multi-head attention output based on processing the updated layer. In some implementations, an element-wise tokenizer processes the instance in the sequence received from the client device. In some of those implementations, the element-wise tokenizer processes only the most recently received instance in the sequence. Additionally or alternatively, the streaming multi-head attention layer of the generative model can be shifted based on the instance in the sequence. In some implementations, after the last instance in the sequence has been processed using the element-wise tokenizer and multi-head attention layer, multi-head attention output can be generated. The multi-head attention output can be processed using the generative model to generate the output responsive to the tokenizable user query. In some implementations, the generative model can be a large language model (LLM). In some implementations, the generative model can include an encoder portion and a decoder portion, where the encoder portion processes received input to generate an encoded representation of the input, and where the decoder portion processes the encoded representation of the input to generate the responsive output. Additionally or alternatively, the generative model at inference time can include only the decoder portion (e.g., the decoder portion was trained with the encoder portion, but at inference time the system only uses the decoder portion for processing).

At block 506, subsequent to receiving the entire sequence, the system generates streaming output responsive to the user voice query based on processing the multi-head attention output using the generative model. In some implementations, the system can wait until all of the output responsive to the user voice query is generated using the generative model before transmitting the output to the client device. Additionally or alternatively, the remote computing device can transmit one or more portions of the output to the client device in a streaming manner, where portion(s) are transmitted to the client device when they are available.

At block 508, the system transmits one or more portions of the streaming output responsive to the user voice query to the client device.

Figure 6:
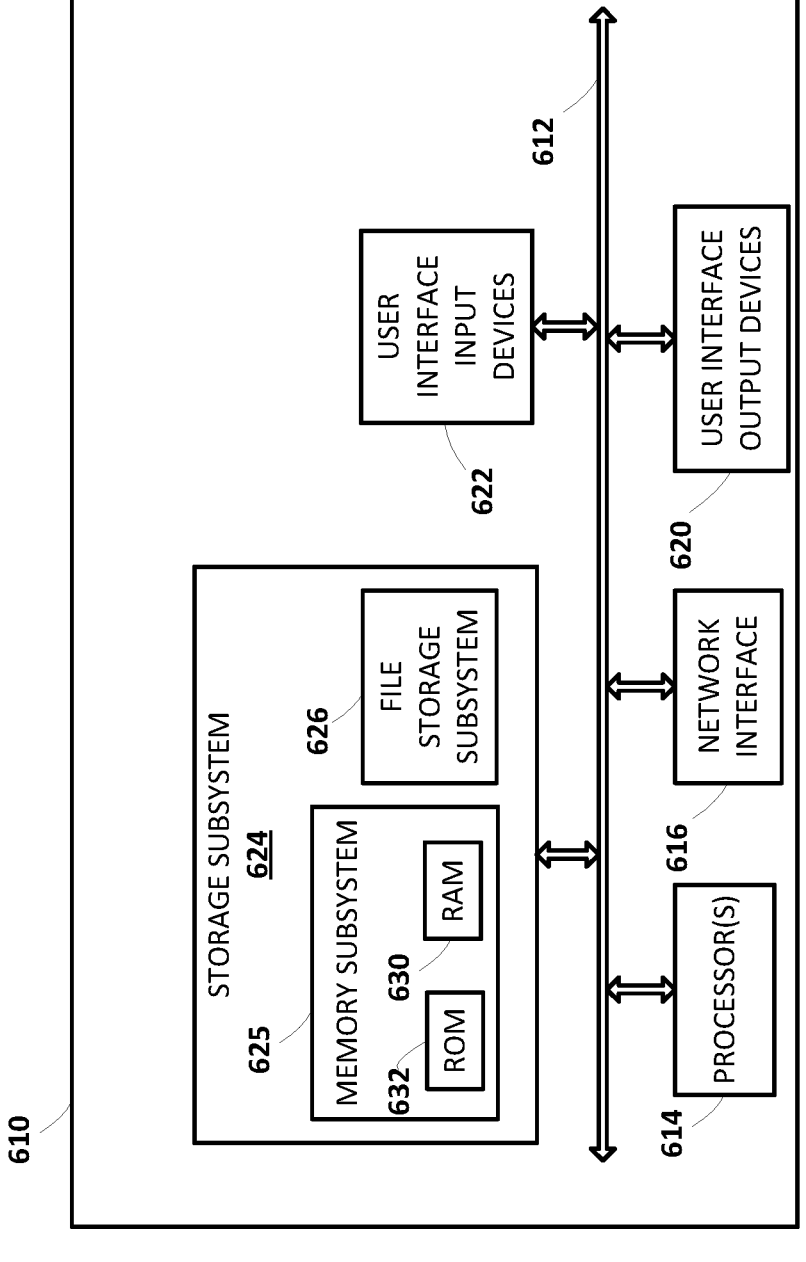
FIG. 6 depicts an example architecture of a computing device, in accordance with various implementations.

FIG. 6 is a block diagram of an example computing device 610 that may optionally be utilized to perform one or more aspects of techniques described herein. In some implementations, one or more of a client computing device, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the process of FIG. 3, FIG. 4, and/or FIG. 5, as well as to implement various components depicted in FIG. 1.

These software modules are generally executed by processor 614 alone or in combination with other processors. Memory 625 used in the storage subsystem 624 can include a number of memories including a main random access memory ("RAM") 630 for storage of instructions and data during program execution and a read only memory ("ROM") 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method is implemented by one or more processors, the method includes identifying an instance of audio data capturing a user voice query captured via one or more microphones of a client device. The method further includes generating, at the client device, a sequence of instances of tokenizable query text by processing the instance of audio data using an automatic speech recognition (ASR) model, where the sequence of instances of tokenizable query text are a text representation of the user voice query. For each of the instances, and in the sequence, the method further includes transmitting the instance of tokenizable query text to a computing system remote from the client device, where one or more of the instances are transmitted from the client device to the computing system before generation of the entire sequence has completed. The method further includes processing the instance using a generative model (GM) at the computing system, wherein processing the instance using the GM at the computing system includes updating one or more portions of an input layer of the GM based on the instance, and generating streamed multi-head attention output based on processing the updated input layer using the GM. While continuing to receive subsequent instances in the sequence, transmitted from the client device to the computing system, the method further includes generating, at the computing system, streaming output responsive to the user voice query based on processing the multi-head attention output using the GM. The method further includes transmitting, from the computing system to the client device, one or more portions of the streaming output responsive to the user voice query. The method further includes rendering output based on the streaming output responsive to the user voice query via one or more user interface output devices of the client device.

These and other implementations of technology disclosed herein can optionally include one or more of the following features.

In some of those implementations, the GM is a large language model.

In some of those implementations, the GM is a decoder portion of a transformer model.

In some of those implementations, the one or more user interface output devices of the client device are one or more speakers. In some of those implementations, rendering output based on the streaming output responsive to the user voice query via the one or more speakers of the client device includes generating, at the client device, output audio data responsive to the user voice query based on processing the streaming output responsive to the user voice query using a text to speech model. In some of those implementations, the method further includes rendering the output audio data responsive to the user voice query based via the one or more speakers of the client device.

In some implementations, the one or more user interface output devices of the client devices are one or more display devices. In some of those implementations, rendering output based on the streaming output responsive to the user voice query via the one or more display devices of the client device includes rendering text output based on the streaming output responsive to the user voice query via the one or more display devices of the client device.

In some implementations, the sequence of instances of tokenizable query text are a sequence of instances of words, characters, or word pieces.

In some implementations, a method implemented by one or more processors is provided, the method includes identifying an instance of audio data capturing a user voice query captured via one or more microphones of a client device. In some implementations, the method further includes generating, at the client device, a sequence of instances of tokenizable query text by processing the instance of audio data using an automatic speech recognition model, where the sequence of instances of tokenizable query text are a text representation of the user voice query. For each of the instances, and in the sequence, the method further includes transmitting the instance of tokenizable query text to a computing system remote from the client device, where one or more of the instances are transmitted before generation of the entire sequence has completed. In some implementations, the method further includes receiving, from the computing system, streaming output responsive to the user voice query, wherein the streaming output responsive to the user voice query is generated at the computing system by processing the sequence of instances of tokenizable query text using a generative model (GM) which includes streamed multi-head attention to generate the streaming output.

In some implementations, the method further includes rendering output based on the streaming output responsive to the user voice query via one or more user interface output devices of the client device.

These and other implementations of technology disclosed herein can optionally include one or more of the following features.

In some implementations, the GM is a large language model.

In some implementations, the GM is a decoder portion of a transformer model.

In some implementations, the one or more user interface output devices of the client device are one or more speakers. In some of those implementations, rendering output based on the streaming output responsive to the user voice query via the one or more speakers of the client device includes generating, at the client device, output audio data responsive to the user voice query based on processing the streaming output responsive to the user voice query using a text to speech model. In some of those implementations, the method further includes rendering the output audio data responsive to the user voice query based via the one or more speakers of the client device.

In some implementations, the one or more user interface output devices of the client devices are one or more display devices. In some versions of those implementations, rendering output based on the streaming output responsive to the user voice query via the one or more display devices of the client device includes rendering text output based on the streaming output responsive to the user voice query via the one or more display devices of the client device.

In some implementations, the sequence of instances of tokenizable query text are a sequence of instances of words, characters, or word pieces.

In some implementations, a method implemented by one or more processors is provided, the method includes receiving, at a computing system remote from a client device, a sequence of instances of tokenizable query text. In some implementations, the sequence of instances of tokenizable query text are a text representation of a user voice query generated at the client device, where the sequence is generated by processing audio data capturing the user voice query using an automatic speech recognition model. In some implementations, one or more instances of the sequence are transmitted before generation of the entire sequence at the client device has completed. For each instance, and in the sequence, processing the instance using a generative model (GM), wherein processing the instance using the GM includes updating one or more portions of an input layer of the GM based on the instance. In some implementations, the method includes generating streamed multi-head attention output based on processing the updated input layer using the GM. While continuing to receive subsequent instances in the sequence, the method includes generating streaming output responsive to the user voice query based on the processing of the multi-head attention output using the GM. In some implementations, the method includes transmitting one or more portions of the streaming output responsive to the user voice query to the client device.

These and other implementations of technology disclosed herein can optionally include one or more of the following features.

In some implementations, the GM is a large language model.

In some implementations, the GM is a decoder portion of a transformer model.

In some implementations, the one or more user interface output devices of the client device are one or more speakers. In some of those implementations, rendering output based on the streaming output responsive to the user voice query via the one or more speakers of the client device includes generating, at the client device, output audio data responsive to the user voice query based on processing the streaming output responsive to the user voice query using a text to speech model. In some of those implementations, the method further includes rendering the output audio data responsive to the user voice query based via the one or more speakers of the client device.

In some implementations, the one or more user interface output devices of the client devices are one or more display devices. In some of those implementations, rendering output based on the streaming output responsive to the user voice query via the one or more display devices of the client device includes rendering text output based on the streaming output responsive to the user voice query via the one or more display devices of the client device.

In some implementations, the sequence of instances of tokenizable query text are a sequence of instances of words, characters, or word pieces.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer readable storage media (e.g., transitory or non-transitory) storing computer instructions executable by one or more processors to perform any of the aforementioned methods. Some implementations also include a computer program product including instructions executable by one or more processors to perform any of the aforementioned methods.

What is claimed is:

1. A system comprising:
memory storing instructions; and
one or more processors that execute the instructions, stored in the memory, to:
    identify an instance of audio data capturing a user voice query captured via one or more microphones of a client device;
    generate, at the client device, a sequence of instances of tokenizable query text by processing the instance of audio data using an automatic speech recognition (ASR) model, where the sequence of instances of tokenizable query text are a text representation of the user voice query;
    for each instance, and in the sequence of instances of tokenizable query text:
        transmit the sequence of instances of tokenizable query text to a computing system remote from the client device, where one or more of the sequence of instances of tokenizable query text are transmitted from the client device to the computing system before generation of an entire sequence has completed;
        process the instance using a generative model (GM) at the computing system, wherein the processing the instance using the GM at the computing system comprises:
            update one or more portions of an input layer of the GM based on the instance;
            generate streamed multi-head attention output based on processing the updated one or more portions of the input layer using the GM;
        while continuing to receive subsequent instances in the sequence, transmitted from the client device to the computing system, generate, at the computing system, streaming output responsive to the user voice query based on processing the streamed multi-head attention output using the GM;
        transmit, from the computing system to the client device, one or more portions of the streaming output responsive to the user voice query; and
        render output based on the streaming output responsive to the user voice query via one or more user interface output devices of the client device.

2. The system of claim 1, wherein the GM is a large language model.

3. The system of claim 1, wherein the GM is a decoder portion of a transformer model.

4. The system of claim 1, wherein the one or more user interface output devices of the client device are one or more speakers, and wherein rendering output based on the streaming output responsive to the user voice query via the one or more speakers of the client device comprises:
    generating, at the client device, output audio data responsive to the user voice query based on processing the streaming output responsive to the user voice query using a text to speech model; and
    rendering the output audio data responsive to the user voice query via the one or more speakers of the client device.

5. The system of claim 1, wherein the one or more user interface output devices of the client device are one or more display devices, and wherein rendering output based on the streaming output responsive to the user voice query via the one or more display devices of the client device comprises:
    rendering text output based on the streaming output responsive to the user voice query via the one or more display devices of the client device.

6. The system of claim 1, wherein the sequence of instances of tokenizable query text are a sequence of instances of words, characters, or word pieces.

7. A method implemented by one or more processors, the method comprising:
    identifying an instance of audio data capturing a user voice query captured via one or more microphones of a client device;
    generating, at the client device, a sequence of instances of tokenizable query text by processing the instance of audio data using an automatic speech recognition model, where the sequence of instances of tokenizable query text are a text representation of the user voice query;
    for each instance, and in the sequence of instances of tokenizable query text:
        transmitting the sequence of instances of tokenizable query text to a computing system remote from the client device, where one or more of the instances are transmitted before generation of an entire sequence has completed;
    receiving, from the computing system, streaming output responsive to the user voice query, wherein the streaming output responsive to the user voice query is generated at the computing system by processing the sequence of instances of tokenizable query text using a generative model (GM) which includes streamed multi-head attention to generate the streaming output responsive to the user voice query; and
    rendering output based on the streaming output responsive to the user voice query via one or more user interface output devices of the client device.

8. The method of claim 7, wherein the GM is a large language model.

9. The method of claim 7, wherein the GM is a decoder portion of a transformer model.

10. The method of claim 7, wherein the one or more user interface output devices of the client device are one or more speakers, and wherein rendering output based on the streaming output responsive to the user voice query via the one or more speakers of the client device comprises:
    generating, at the client device, output audio data responsive to the user voice query based on processing the streaming output responsive to the user voice query using a text to speech model; and rendering the output audio data responsive to the user voice query via the one or more speakers of the client device.

11. The method of claim 7, wherein the one or more user interface output devices of the client device are one or more display devices, and wherein rendering output based on the streaming output responsive to the user voice query via the one or more display devices of the client device comprises:

rendering text output based on the streaming output responsive to the user voice query via the one or more display devices of the client device.

12. The method of claim 7, wherein the sequence of instances of tokenizable query text are a sequence of instances of words, characters, or word pieces.

13. A method implemented by one or more processors, the method comprising:

receiving, at a computing system remote from a client device, a sequence of instances of tokenizable query text, wherein the sequence of instances of tokenizable query text are a text representation of a user voice query generated at the client device, where the sequence of instances of tokenizable query text are generated by processing audio data capturing the user voice query using an automatic speech recognition model, and wherein one or more instances of the sequence of instances of tokenizable query text are transmitted before generation of the entire sequence at the client device has completed;

for each instance, and in the sequence of instances of tokenizable query text:

processing the instance using a generative model (GM), wherein the processing the instance using the GM comprises:

updating one or more portions of an input layer of the GM based on the instance;

generating streamed multi-head attention output based on processing the updated one or more portions of the input layer using the GM;

while continuing to receive subsequent instances in the sequence, generating streaming output responsive to the user voice query based on the processing the streamed multi-head attention output using the GM; and transmitting one or more portions of the streaming output responsive to the user voice query to the client device.

14. The method of claim 13, wherein the GM is a large language model.

15. The method of claim 13, wherein the GM is a decoder portion of a transformer model.

16. The method of claim 13, wherein one or more user interface output devices of the client device are one or more speakers, and wherein rendering output based on the streaming output responsive to the user voice query via the one or more speakers of the client device comprises:

generating, at the client device, output audio data responsive to the user voice query based on processing the streaming output responsive to the user voice query using a text to speech model; and rendering the output audio data responsive to the user voice query via the one or more speakers of the client device.

17. The method of claim 13, wherein the one or more user interface output devices of the client device are one or more display devices, and wherein rendering output based on the streaming output responsive to the user voice query via the one or more display devices of the client device comprises:

rendering text output based on the streaming output responsive to the user voice query via the one or more display devices of the client device.

18. The method of claim 13, wherein the sequence of instances of tokenizable query text are a sequence of instances of words, characters, or word pieces.

* * * * *